US009208255B2

(12) United States Patent
Kim

(10) Patent No.: US 9,208,255 B2
(45) Date of Patent: Dec. 8, 2015

(54) METHOD OF CONVERTING DATA OF DATABASE AND CREATING XML DOCUMENT

(75) Inventor: Youngkun Kim, Gyeonggi-do (KR)

(73) Assignee: Chun Gi Kim, Gyeongsangbuk-do (KR)

( * ) Notice: Subject to any disclaimer, the term of this patent is extended or adjusted under 35 U.S.C. 154(b) by 873 days.

(21) Appl. No.: 13/353,956

(22) Filed: Jan. 19, 2012

(65) Prior Publication Data

US 2013/0132826 A1   May 23, 2013

(30) Foreign Application Priority Data

Nov. 18, 2011   (KR) .................. 10-2011-0120957

(51) Int. Cl.
*G06F 17/00* (2006.01)
*G06F 17/30* (2006.01)

(52) U.S. Cl.
CPC .... *G06F 17/30914* (2013.01); *G06F 17/30917* (2013.01)

(58) Field of Classification Search
USPC .................................................. 707/E17.125
See application file for complete search history.

(56) References Cited

U.S. PATENT DOCUMENTS

| 6,421,656 | B1 * | 7/2002 | Cheng et al. ........................... 1/1 |
| 6,519,597 | B1 * | 2/2003 | Cheng et al. ........................... 1/1 |
| 6,584,459 | B1 * | 6/2003 | Chang et al. ................... 707/812 |
| 6,604,100 | B1 * | 8/2003 | Fernandez et al. .................... 1/1 |
| 6,704,736 | B1 * | 3/2004 | Rys et al. ............................... 1/1 |
| 7,287,216 | B1 * | 10/2007 | Lee et al. ....................... 715/234 |
| 7,353,222 | B2 * | 4/2008 | Dodds et al. ........................... 1/1 |
| 8,010,887 | B2 * | 8/2011 | Soria et al. ..................... 715/229 |
| 8,150,818 | B2 * | 4/2012 | Van Der Linden et al. ... 707/705 |
| 8,694,510 | B2 * | 4/2014 | Krishnamurthy ............. 707/747 |
| 8,862,636 | B2 * | 10/2014 | Han et al. ....................... 707/809 |
| 2002/0073080 | A1 * | 6/2002 | Lipkin ............................... 707/3 |
| 2002/0123993 | A1 * | 9/2002 | Chau et al. ........................ 707/5 |
| 2003/0018650 | A1 * | 1/2003 | Priestley ....................... 707/102 |

(Continued)

FOREIGN PATENT DOCUMENTS

| JP | 2004-240507 | 8/2004 |
| KR | 10-1999-0070968 | 9/1999 |

(Continued)

OTHER PUBLICATIONS

Joo et al., "Rule Based Document Conversion and Information Extraction on the Word Document," Korea Computer Congress 2006, vol. 33, pp. 106-108. (English abstract attached.).

*Primary Examiner* — Scott Baderman
*Assistant Examiner* — Benjamin J Smith
(74) *Attorney, Agent, or Firm* — Klarquist Sparkman, LLP

(57) ABSTRACT

Disclosed herein is a method of converting data of a database and creating an XML document. In the method, a source XML document has user-defined tags is designed. The source XML document is separated into an XML document for normal data conversion which is used when converting normal data, and an XML document for repetitive data conversion which is used when converting repetitive data. An SQL query statement for data to be converted in a DB is generated. The SQL query statement is executed on the DB and thereafter resulting data obtained as a result of executing the SQL query statement is stored in a storage sheet. The structural data of the source XML document is mapped to the resulting data stored in the storage sheet. A new XML document is created by replacing the structural data of the source XML document with the resulting data.

20 Claims, 18 Drawing Sheets

(56) References Cited

U.S. PATENT DOCUMENTS

| | | | |
|---|---|---|---|
| 2003/0046317 A1* | 3/2003 | Cseri et al. | 707/513 |
| 2003/0177443 A1* | 9/2003 | Schnelle et al. | 715/513 |
| 2003/0233347 A1* | 12/2003 | Weinberg et al. | 707/3 |
| 2004/0006563 A1* | 1/2004 | Zwiegincew et al. | 707/10 |
| 2004/0044959 A1* | 3/2004 | Shanmugasundaram et al. | 715/513 |
| 2004/0148278 A1* | 7/2004 | Milo et al. | 707/3 |
| 2005/0010896 A1* | 1/2005 | Meliksetian et al. | 717/106 |
| 2005/0050467 A1* | 3/2005 | Loeser et al. | 715/530 |
| 2005/0165866 A1* | 7/2005 | Bohannon et al. | 707/203 |
| 2006/0167929 A1* | 7/2006 | Chakraborty et al. | 707/102 |
| 2008/0021916 A1* | 1/2008 | Schnelle et al. | 707/101 |
| 2008/0091703 A1* | 4/2008 | Murthy | 707/102 |
| 2009/0077625 A1* | 3/2009 | Van Der Linden et al. | 726/1 |
| 2009/0327253 A1* | 12/2009 | Joseph | 707/4 |
| 2012/0254260 A1* | 10/2012 | Irons | 707/809 |

FOREIGN PATENT DOCUMENTS

| | | |
|---|---|---|
| KR | 10-2003-0063559 | 7/2003 |
| KR | 10-2005-0108919 | 11/2005 |
| KR | 10-2008-0027251 | 3/2008 |
| KR | 10-2009-0090046 | 8/2009 |
| KR | 10-2011-0075672 | 7/2011 |

* cited by examiner

FIGURE 12

| PRIMARY KEY VALUE | 1.REPETITIVE DATA | 2.REPETITIVE DATA | | N.REPETITIVE DATA |
|---|---|---|---|---|
| 1 | <item3>... | <item>... | | <item>... |
| 2 | <item3>... | <item>... | | <item>... |
| 3 | <item3>... | <item>... | ... | <item>... |
| 4 | <item3>... | <item>... | | <item>... |
| 5 | <item3>... | <item>... | | <item>... |
| 6 | <item3>... | <item>... | | <item>... |
| ... | ... | ... | | ... |

FIGURE 15

NORMAL DATA SHEET

| PRIMARY KEY VALUE |
|---|
| 1 |
| 2 |
| 3 |
| 4 |
| 5 |
| 6 |
| ... |
| n |

| PRIMARY KEY VALUE | PRIMARY KEY VALUE |
|---|---|
| 1 | 1 |
| 2 | 2 |
| 3 | 3 |
| 4 | 4 |
| 5 | 5 |
| 6 | 6 |
| ... | ... |
| n | n |

· · ·

| PRIMARY KEY VALUE |
|---|
| 1 |
| 2 |
| 3 |
| 4 |
| 5 |
| 6 |
| ... |
| n |

REPETITIVE DATA SHEET

| PRIMARY KEY VALUE | 1.REPETITIVE DATA SHEET | 2.REPETITIVE DATA SHEET |
|---|---|---|
| 1 | <item3>... | <item>... |
| 2 | <item3>... | <item>... |
| 3 | <item3>... | <item>... |
| 4 | <item3>... | <item>... |
| 5 | <item3>... | <item>... |
| 6 | <item3>... | <item>... |
| ... | ... | ... |

· · ·

| N.REPETITIVE DATA SHEET |
|---|
| <item>... |
| <item>... |
| <item>... |
| <item>... |
| <item>... |
| <item>... |
| ... |

XML DOCUMENT

```
<root>
  <item1>a1</item1>
  <item2>
     <item21>b1</item21>
     <item22>c1</item22>
  </item2>

<item3>
     <item31>A1</item31>
     <item32>A2</item32>
  </item3>
  <item3>
     <item31>B1</item31>
     <item32>B2</item32>
  </item3>
    ...
</root>
```

```
<item3>
    <item31 repeat="y"> bx_item01</item31>
    <item32 repeat="y"> bx_item02</item32>
    <item33 repeat="y"> bx_item03</item33>
    <item34 repeat="y"> bx_item04</item34>
</item3>
```

METHOD OF CONVERTING DATA OF DATABASE AND CREATING XML DOCUMENT

CROSS-REFERENCES TO RELATED APPLICATION

This patent application claims the benefit of priority under 35 U.S.C. §119 from Korean Patent Application No. 10-2011-0120957 filed on Nov. 18, 2011, the contents of which are incorporated herein by reference.

BACKGROUND OF THE INVENTION

1. Field of the Invention

The present invention relates, in general, to a method of converting the data of a database and creating an eXtensible Markup Language (XML) document and, more particularly, to a method of converting the data of a database and creating an XML document, which converts large-capacity data stored in a database using XML replacement technology, and then creating a dynamic well-formed XML document.

2. Description of the Related Art

The Internet connects a large number of communication networks spread all over the world to one another, and computers connected to the Internet use a communication protocol such as a Transmission Control Protocol/Internet Protocol (TCP/IP) so as to perform communication among the computers.

Further, HyperText Markup Language (HTML) is one of the data formats used in the World Wide Web (WWW), and is a scheme for describing hyper media documents. HTML defines the logical structure of hypertext using a standardized document format called a Standard Generalized Markup Language (SGML) and is stored in the format of a typical text file.

In order for a user to view a specific web page using a web browser such as Internet Explorer, it is general to enter the Uniform Resource Locator (URL) address of the web page. Therefore, when the user does not know the URL address of a relevant web page, it is difficult to access a target document.

Therefore, software is required which can easily search for the user's desired information among a great amount of information overflowing on the Internet even if the user is not aware of URL information about individual Internet sites. This software is commonly referred to as a search engine.

The principle of a search engine is that pieces of information about websites, collected in advance while a search robot or a predetermined search program called a spider program goes around a plurality of sites open on the Internet, are stored in a database (DB) and that when the user enters a specific keyword, only websites containing content matching the entered keyword are selected from the DB and then presented. In more detail, the search engine runs a spider program via a Common Gateway Interface (CGI) when a search request, such as keyword entry, is received from a user computer.

Here, the term "CGI" denotes a standard interface which is disposed between a web server and an external program and is configured to receive data from a web browser installed on a user computer, execute an externally installed program according to the received data and receive the results of the execution from the executed program. The running spider program receives the results of the search from an index DB in which the URL addresses and pieces of information of various types of websites are stored, converts the search results into a document in HTML format, and transmits the HTML document to the user computer.

In the case of such search engines, at the beginning when Internet services were initiated, a directory-based search scheme was used in which a search engine searches and classifies individual Internet sites and web documents and arranges the search and classification results into a DB and which can access final data while gradually subdividing the classes of preset themes according to the theme search or menu search selected by the user.

However, as the scale of the World Wide Web has gradually and rapidly expanded, and the number of Internet sites has suddenly increased, it has become impossible to smoothly search for desired information by using such a directory-based search scheme. That is, data held in the search engine must also increase in proportion to the scale of the World Wide Web that has rapidly expanded. However, as in the case of the conventional search engine, an existing method of checking a single web page and storing the checked web page in the DB using a manual operation is inadequate for keeping up with the growth trend of the World Wide Web.

For this reason, a search engine has appeared in which the concept of the above-described search robot is introduced and which automatically searches for web pages, indexes the web pages, and then provides a search service. Such a search engine uses a keyword (search word)-based search method, searches for all web documents related to a keyword entered by the user, and then provides the results of the search to the computer or the like of the user. However, there is an inconvenience in that an excessively large number of web documents are found in the search, thus causing the user to search again for his or her desired contents on a screen showing the search results.

Meanwhile, XML is an abbreviated form of extensible markup language, and is a next generation Internet document standard which must be essentially used in the age of the Internet in the future. This was defined as a format for Internet standard documents by the World Wide Web Consortium (W3C) in 1998. This XML is implemented in a structure which can be easily understood by human beings and which can be easily read by machines, and is a language generated by making up for the disadvantages of SGML while overcoming restrictions in the representation of HTML.

HTML that has been most widely used to date as a content representation language on the Internet is suitable for the function of representation, but has limitations when it is desired to reuse documents or search for documents. The reason for paying attention to XML as the next generation Internet language for overcoming the above limitations is that XML is a language enabling scalability, compatibility and the structuring of information to be realized.

Meanwhile, a DB is a structure for data stored according to a specific relationship reflecting the meaning of data. Since a DB, as a warehouse of information, is used by a large number of application programs, the structure of the DB must be able to be modified without having to revise application programs.

Generally, the development of a DB-based data model scheme has been conducted in such a way that information is stored in a DB on the basis of the DB, search results are received from the DB at the request of a user and are converted into a document in HTML format, and the HTML document is transmitted to a user computer.

For example, a method of searching for Internet data and arranging the Internet data into a DB is disclosed in Korean Patent Application No. 10-1998-0006152. This discloses a scheme for separately arranging only data belonging to a specific field, among pieces of information on the Internet, into a DB, and for enabling a commercial search service using such a separate DB to be provided. A web browsing system and web browsing method for attaching additional link information to an HTML document provided at the request of a user is disclosed in Korean Patent Application No. 10-2008-0015282. This web browsing system and method discloses that additional link information is selectively attached to an HTML document received from a specific web server at the request of the user and interpreted by the web browser, thus allowing the user to conveniently and efficiently perform web surfing and searching. However, as described above, the above patents are problematic in that they must convert search results into an HTML format and transmit the converted search results to a user computer, thus deteriorating the speed of a data search, and in that when errors occur during a procedure for receiving search results and converting the search results into an HTML format, incorrect search results may be displayed.

SUMMARY OF THE INVENTION

Accordingly, the present invention has been made keeping in mind the above problems occurring in the prior art, and an object of the present invention is to provide a method of converting the data of a DB and creating an XML document, which can promptly create a dynamic well-formed eXtensible Markup Language (XML) document that can be easily used, from the large-capacity data of a DB by exploiting XML replacement technology without using a Document Object Model (DOM).

In order to accomplish the above object, the present invention provides a method of converting data of a database (DB) and creating an eXtensible Markup Language (XML) document, including designing a source XML document provided with user-defined tags, separating the source XML document into an XML document for normal data conversion which is used when converting normal data, among structural data of the source XML document, and an XML document for repetitive data conversion which is used when converting repetitive data, generating a Structured Query Language (SQL) query statement for data to be converted in a DB, executing the SQL query statement on the DB and thereafter storing resulting data obtained as a result of executing the SQL query statement in a storage sheet, mapping the structural data of the source XML document to the resulting data stored in the storage sheet, and creating a new XML document by replacing the structural data of the source XML document with the resulting data stored in the storage sheet.

Preferably, after the creating the new XML document has been performed, the storing the resulting data, the mapping the structural data, and the creating the new XML document may be continuously and repeatedly performed, thus continuously creating a plurality of new XML documents.

Preferably, the storing the resulting data may be repeatedly performed, and then resulting data may be continuously stored in the storage sheet, and the creating the new XML document may be repeatedly performed, so that the structural data of the source XML document is continuously replaced with the resulting data stored in the storage sheet, thus continuously creating a plurality of new XML documents.

Preferably, the designing the source XML document may include defining a source XML document that includes a preset structure and preset source data by using the user-defined tags, and duplicating the source XML document and then creating a duplicated XML document including a structure and source data which are identical to those of the source XML document.

Preferably, at the defining the source XML document, the source XML document may store an absolute path of the user-defined tags as user-defined tag values using an XML tree structure.

Preferably, at the defining the source XML document, when normal data and repetitive data which correspond to the structural data of the source XML document are indicated on user-defined tag values, they may be separately indicated using different indication methods so that the normal data can be distinguished from the repetitive data.

Preferably, at the defining the source XML document, when the user-defined tags of the source XML document are defined, if the structural data of the source XML document is repetitive data, the repetitive data may be differently indicated by attributes.

Preferably, at the separating the source XML document, the XML document for normal data conversion may be stored after the repetitive data has been modified into a specific format indicating the repetitive data.

Preferably, at the separating the source XML document, the XML document for repetitive data conversion may be stored after replacement parts of the repetitive data have been modified into a specific format so that the replacement parts are sequentially replaced with the resulting data stored in the storage sheet.

Preferably, at the generating the SQL query statement, the SQL query statement may include a main query statement for loading primary keys of large-capacity data included in the DB, a main sub-query statement for connecting a plurality of pieces of table information using the primary keys and then loading the normal data, and a sub-query statement for connecting a plurality of pieces of table information using the primary keys and then loading the repetitive data.

Preferably, at the storing the resulting data, the storage sheet may include a normal data storage sheet for storing the normal data, and a repetitive data storage sheet for storing the repetitive data.

Preferably, at the storing the resulting data, a method of storing the normal data of the resulting data may include executing the main query statement and storing values of the primary keys and a number of results of execution of the main query statement in the normal data storage sheet, and executing the main sub-query statement a number of times identical to the number of results of the execution of the main query statement and storing resulting data obtained from the execution in the normal data storage sheet.

Preferably, at the storing the resulting data, a method of storing the repetitive data of the resulting data may include executing the main query statement and storing values of the primary keys in the repetitive data storage sheet, and executing the sub-query statement and storing resulting data obtained from the execution in the repetitive data storage sheet.

Preferably, at the mapping the structural data, the resulting data obtained as the result of executing the main query statement and the main sub-query statement may be connected to user-defined tags of the XML document for normal data conversion, thus generating mapping information of the normal data.

Preferably, at the mapping the structural data, the resulting data obtained as the result of executing the main query statement and the sub-query statement may be connected to user-defined tags of the XML document for repetitive data conversion, thus generating mapping information of the repetitive data.

BRIEF DESCRIPTION OF THE DRAWINGS

The above and other objects, features and advantages of the present invention will be more clearly understood from the following detailed description taken in conjunction with the accompanying drawings, in which:

FIG. 12 is a diagram showing the construction of a repetitive data storage sheet according to the present invention;

FIG. 15 is a diagram showing a state in which a new XML document is created at a new XML document creation step according to the present invention;

DESCRIPTION OF THE PREFERRED EMBODIMENTS

Figure 1:
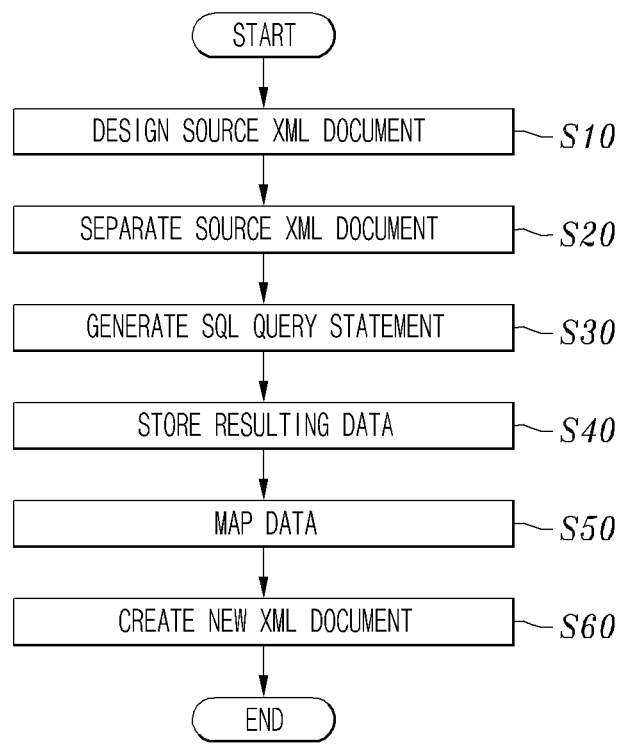
FIG. 1 is a first flowchart showing a method of converting the data of a DB and creating an XML document according to the present invention.

Hereinafter, embodiments of the present invention will be described in detail with reference to the attached drawings. Reference now should be made to the drawings, in which the same reference numerals are used throughout the different drawings to designate the same or similar components. If in the specification, detailed descriptions of well-known functions or configurations may unnecessarily make the gist of the present invention obscure, the detailed descriptions will be omitted.

Figure 7:
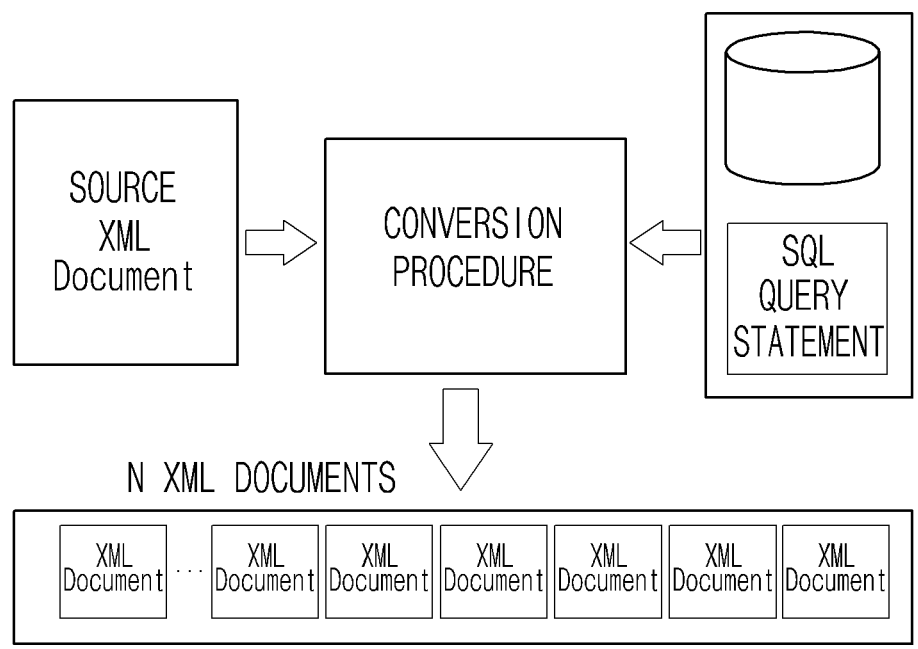
FIG. 7 is a diagram schematically showing a method of converting the data of a DB and creating an XML document according to the present invention.

FIG. 7 is a diagram schematically showing a method of converting the data of a DB and creating an XML document according to the present invention.

As shown in FIG. 7, the present invention relates to technology for creating a dynamic well-formed XML document from large-capacity data stored in a DB by using XML replacement technology without using a Document Object Model (DOM). More particularly, the present invention relates to a method of replacing the structure of an XML document having user-defined tags and creating a well-formed XML document.

The present invention may convert an SQL query statement into a form to be used in a conversion procedure, receive the converted form, and map a predefined XML document, thus promptly creating an XML document. A standard recording medium that can be used in a web browser can be provided using a method of converting large-capacity data stored in a DB and creating an XML document according to the present invention.

FIG. 1 is a first flowchart showing a method of converting the data of a DB and creating an XML document according to the present invention.

As shown in FIG. 1, a method of converting the data of a DB and creating an XML document according to the present invention includes a source XML document design step S10, a source XML document separation step S20, an SQL query statement generation step S30, a resulting data storage step S40, a data mapping step S50, and a new XML document creation step S60.

The source XML document design step S10 is the step of designing a source XML document provided with user-defined tags.

Figure 4:
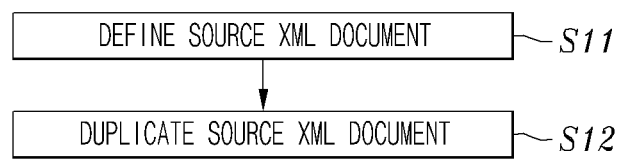
FIG. 4 is a flowchart showing a source XML document design step according to the present invention.

FIG. 4 is a flowchart showing the source XML document design step according to the present invention.

As show in FIG. 4, the source XML document design step S10 includes a source XML document definition step S11 and a source XML document duplication step S12.

The source XML document definition step S11 is the step of defining a source XML document including a preset structure and preset source data using the user-defined tags.

Figure 8:
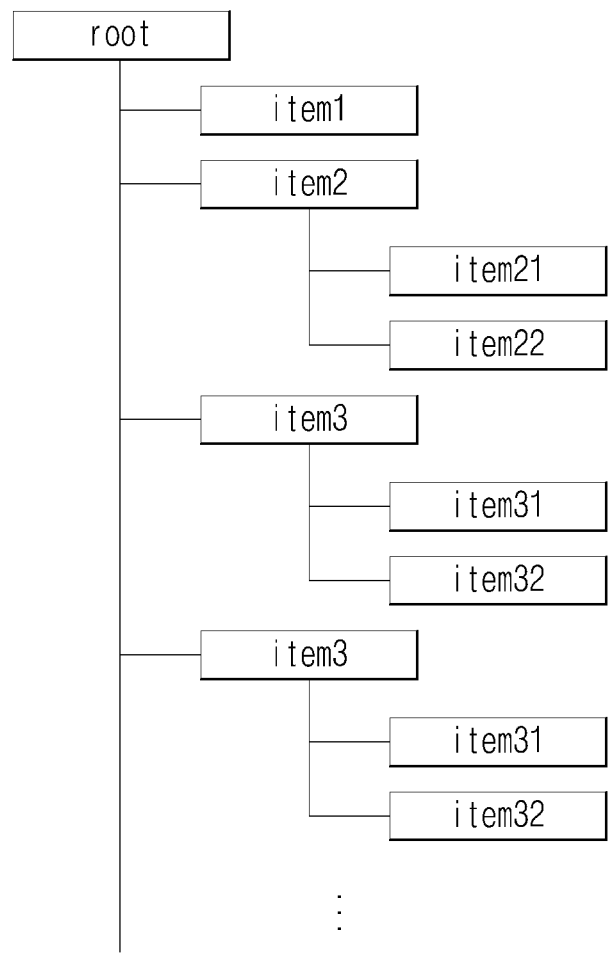
FIG. 8 is a diagram showing the data structure of an XML document according to the present invention.

FIG. 8 is a diagram showing the data structure of an XML document according to the present invention.

At the source XML document definition step S11, the source XML document may store the absolute path of the user-defined tags as user-defined tag values using an XML tree structure.

In detail, the XML document having the data structure of FIG. 8 can be created as the following XML document.

```
<root>
    <item1>H_root/item1</item1>
    <item2>
        <item21>H_root/item2/item21</item21>
        <item22>H_root/item2/item22</item22>
    </item2>
    <item3>
        <item31
        repeat="y"> H_LIST_root/item3/item31</item31>
        <item32
        repeat="y">H_LIST_root/item3/item32</item32>
    </item3>
</root>
```

In this case, when normal data and repetitive data which are pieces of structural data of the source XML document are indicated on the user-defined tag values, the normal data and the repetitive data may be separately indicated using different indication methods so that the normal data can be distinguished from the repetitive data.

In detail, when normal data and repetitive data are indicated on the user-defined tag values, it is preferable to differently indicate the normal data and the repetitive data in such a way that the normal data is indicated by "H_" and the repetitive data is indicated by "H_LIST".

Further, when the user-defined tags of the source XML document are defined, if the structural data of the source XML document is repetitive data, the repetitive data may be differently indicated by attributes.

In detail, when the user-defined tags of the source XML document are defined, the repetitive data is preferably differently indicated by the attribute repeat="y".

The following Table 1 shows examples of user-defined tags based on the data types of the source XML document defined at the source XML document definition step S11, and examples of tag values, as described above.

TABLE 1

| Data type | Distinguish | Tag | Tag value |
|---|---|---|---|
| Normal data | | <item1> | H_root/item1 |
| Repetitive data | Repeat = "y" | <item31 repeat="y"> | H_LIST_root/item3/item31 |

The source XML document duplication step S12 is the step of duplicating the source XML document and then creating a duplicated XML document that has the same structure and the same source data as those of the source XML document.

Therefore, according to the present invention, a predefined XML document is duplicated at the source XML document duplication step S11, and thereafter an XML document having the same structure can be dynamically created using a replacement method.

The source XML document separation step S20 is the step of separating the source XML document into an XML document for normal data conversion which is used when converting normal data, among the structural data of the source XML document, and an XML document for repetitive data conversion which is used when converting repetitive data among the structural data.

At the source XML document separation step S20, the XML document for normal data conversion may be stored after the repetitive data has been modified into a specific format indicating repetitive data.

In detail, the XML document for normal data conversion may be stored after repetitive data has been modified into the format bx_tagname. As shown in the following example, when the node set 'item3' is repetitive data, it is preferably modified into 'bx_item3', and then the XML document may be stored.

```
<root>
    <item1>H_root/item1</item1>
    <item2>
        <item21>H_root/item2/item21</item21>
        <item22>H_root/item2/item22</item22>
    </item2>
    <item3>
        bx_item3
    </item3>
</root>
```

Meanwhile, at the source XML document separation step S20, the XML document for repetitive data conversion may be stored after the replacement parts of repetitive data have been modified into a specific format so that the replacement parts are sequentially replaced with pieces of resulting data stored in a storage sheet, which will be described later.

In detail, the XML document for repetitive data conversion is preferably stored such that, as shown in the following example, replacement parts of the repetitive data are modified into formats 'bx_item001', 'bx_item002', . . . .

```
<item3>
    <item31 repeat="y"> bx_item001</item31>
    <item32 repeat="y"> bx_item002</item32>
</item3>
```

The SQL query statement generation step S30 is the step of generating an SQL query statement for data to be converted in the DB.

Figure 9:
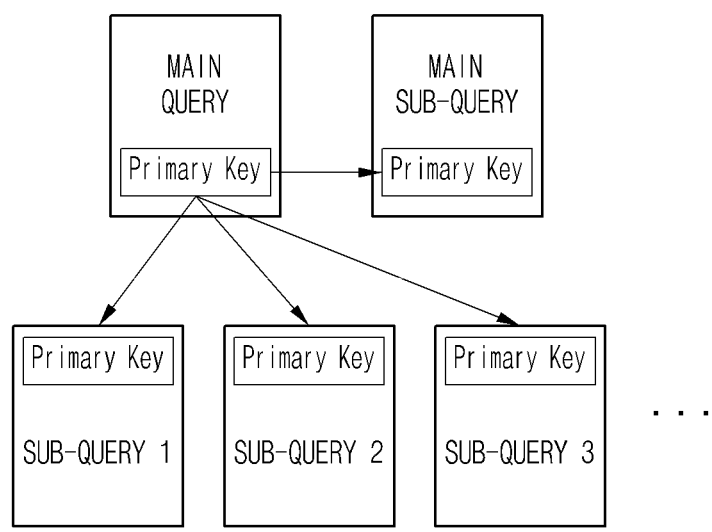
FIG. 9 is a diagram showing the structure of an SQL query statement according to the present invention.

FIG. 9 is a diagram showing the structure of an SQL query statement according to the present invention.

At the SQL query statement generation step S30, an SQL query statement to be executed on a DB includes three types such as a main query statement, a main sub-query statement, and a sub-query statement. The configuration of the SQL query statement may be made up by connecting primary keys to one another, as shown in FIG. 9.

Here, a main query statement is a query statement for loading the primary key of large-capacity data stored in the DB. In particular, the main query statement is generated to load the primary key of the large-capacity data and is generated to convert 5,000 cases at one time using a paging division function because large-capacity conversion must be executed by dividing large-capacity data several times.

Further, a main sub-query statement is a query statement for loading normal data after connecting a plurality of pieces of table information using the primary keys. Such a sub-query statement is a query statement for loading repetitive data after connecting a plurality of pieces of table information using the primary keys.

Figure 10:
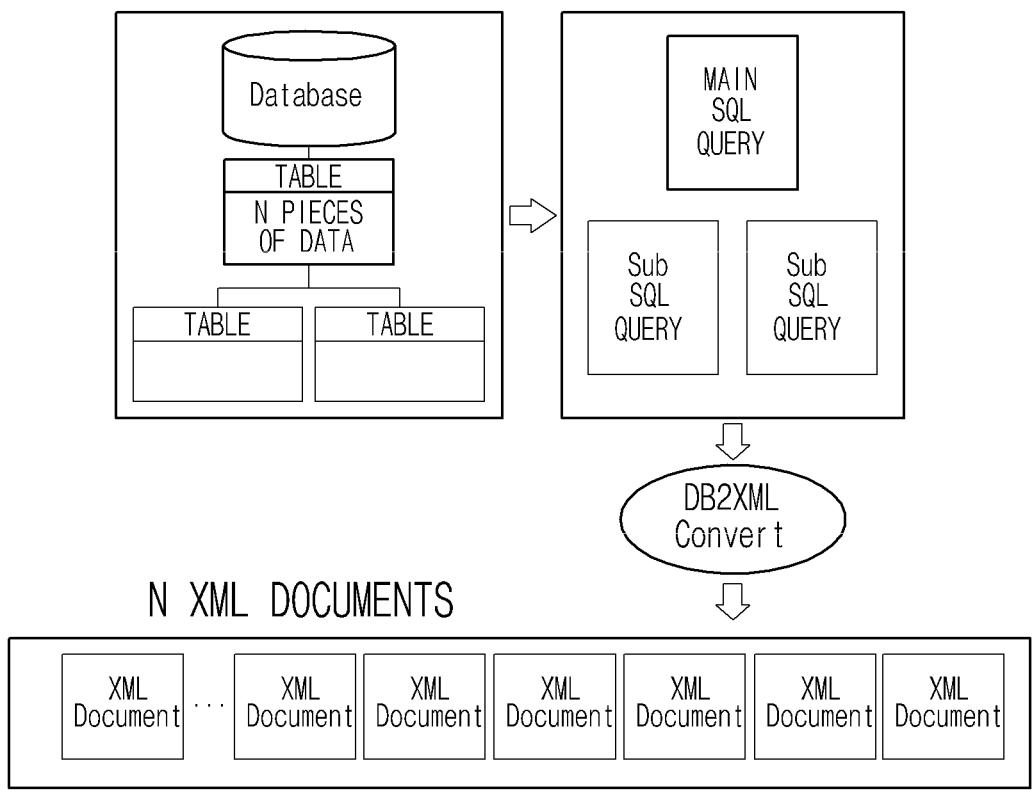
FIG. 10 is a diagram schematically showing a method of executing an SQL query statement and creating an XML document according to the present invention.

FIG. 10 is a diagram schematically showing a method of executing an SQL query statement and creating an XML document according to the present invention.

Therefore, according to the present invention, as shown in FIG. 10, the SQL query statement is executed on the DB, and thereafter an XML document may be created using a DB2XML Convert function. Here, the term "DB2XML Convert" in FIG. 10 means conversion from DB into XML.

The main sub-query statement and the sub-query statement may be generated in the following format so that they are executed by connecting the primary keys of the main query statement.

```
select A.filed1 from TABLE A where A. Key='bx_key'
```

The resulting data storage step S40 is the step of, after the SQL query statement has been executed on the DB, storing resulting data, obtained as the result of executing the SQL query statement, in the storage sheet.

In this case, the storage sheet may be divided into a normal data storage sheet and a repetitive data storage sheet. The normal data storage sheet is a sheet for storing the normal data of the DB, and the repetitive data storage sheet is a sheet for storing the repetitive data of the DB.

Figure 5:
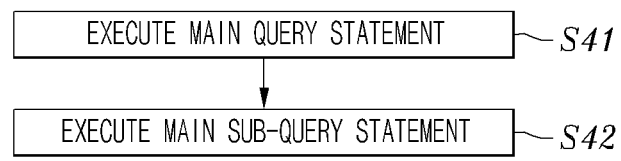
FIG. 5 is a first flowchart showing a resulting data storage step according to the present invention.
Figure 11:
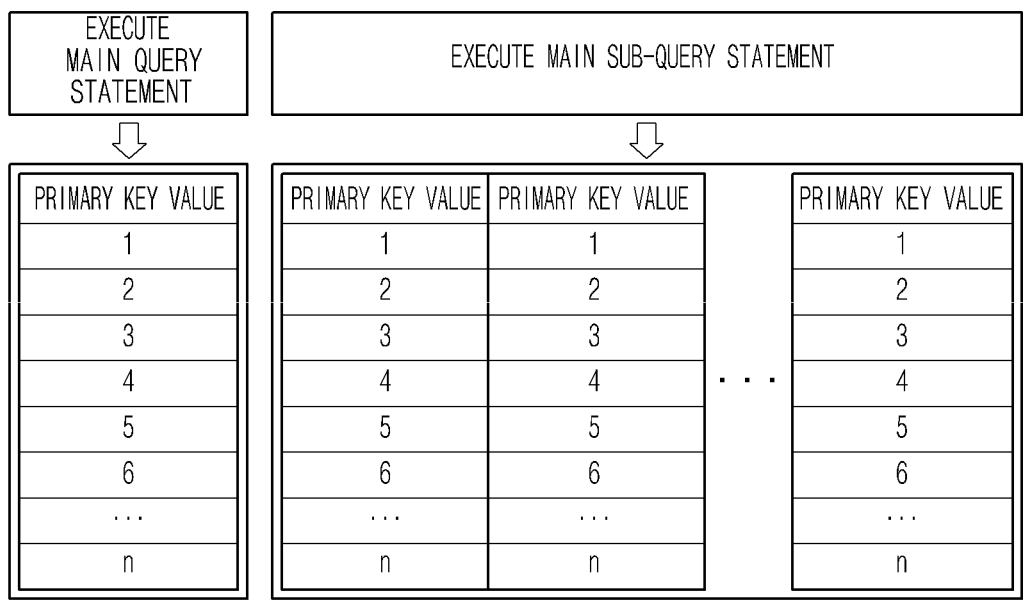
FIG. 11 is a diagram showing the construction of a normal data storage sheet according to the present invention.

FIG. 5 is a first flowchart showing the resulting data storage step according to the present invention, and FIG. 11 is a diagram showing the configuration of the normal data storage sheet according to the present invention.

At the resulting data storage step S40, a method of storing the normal data of the resulting data includes a main query statement execution step S41 and a main sub-query statement execution step S42, as shown in FIG. 5.

The main query statement execution step S41 is the step of executing a main query statement and storing the values of primary keys and the number of results of the execution of the main query statement in the normal data storage sheet.

The main sub-query statement execution step S42 is the step of executing the main sub-query statement a number of times identical to the number of results of the execution of the main query statement, and storing resulting data obtained from the execution in the normal data storage sheet.

That is, in order to load normal data from the DB, as shown in FIG. 11, the main query statement is primarily executed, so that the values of primary keys and the number of results of the execution of the main query statement are stored in the sheet. Then, the main sub-query statement may be executed a number of times identical to the number of results of the execution of the main query statement, and then resulting values may be stored in the normal data storage sheet. Therefore, the resulting values obtained from the execution of the main query statement and the main sub-query statement are stored in the normal data storage sheet.

Figure 6:
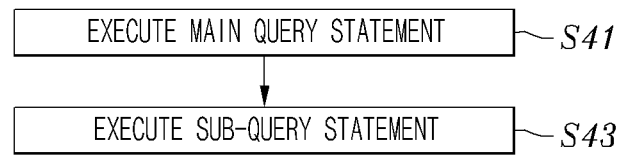
FIG. 6 is a second flowchart showing a resulting data storage step according to the present invention.

FIG. 6 is a second flowchart showing the resulting data storage step according to the present invention, and FIG. 12 is a diagram showing the configuration of the repetitive data storage sheet according to the present invention.

Meanwhile, at the resulting data storage step S40, a method of storing the repetitive data of the resulting data includes a main query statement execution step S41 and a sub-query statement execution step S43, as shown in FIG. 6.

The main query statement execution step S41 is the step of executing a main query statement and storing the values of primary keys in the repetitive data storage sheet.

The sub-query statement execution step S42 is the step of executing a sub-query statement and storing resulting data obtained from the execution in the repetitive data storage sheet.

That is, in order to load repetitive data from the DB, a main query statement may be primarily executed to store the values of primary keys in the sheet, and a sub-query statement based on the primary keys may be subsequently executed to store resulting values obtained from the execution in the repetitive data storage sheet, as shown in FIG. 12.

The data mapping step S50 is the step of mapping the structural data of the source XML document to the resulting data stored in the storage sheet.

Figure 13:
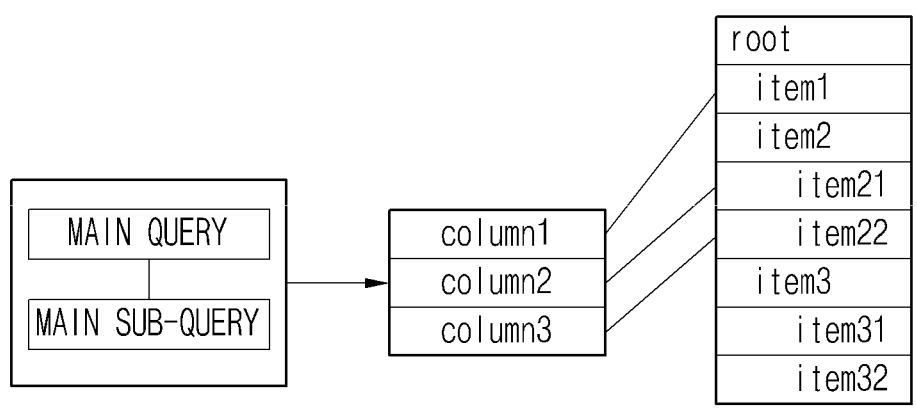
FIG. 13 is a diagram showing a state in which normal data stored in the normal data storage sheet is mapped to user-defined tags stored in an XML document for normal data conversion according to the present invention.

FIG. 13 is a diagram showing a state in which pieces of normal data stored in the normal data storage sheet are mapped to user-defined tags stored in an XML document for normal data conversion according to the present invention.

As shown in FIG. 13, at the data mapping step S50, pieces of normal data stored in the normal data storage sheet and the user-defined tags stored in the XML document for normal data conversion may be mapped to one another.

The following Table 2 shows examples of the mapping information of normal data, wherein the mapping information of the normal data may be generated by respectively connecting pieces of resulting data, that is, Column1, Column2, and Column3, obtained as the result of executing the main query statement and the main sub-query statement, to user-defined tags Item1, Item21, and Item22 of the XML document for normal data conversion.

TABLE 2

| Column name | XML tag | XML tag value |
| --- | --- | --- |
| Column1 | Item1 | H_root/item1 |
| Column2 | Item21 | H_root/item2/item21 |
| Column3 | Item22 | H_root/item2/item22 |

Figure 14:
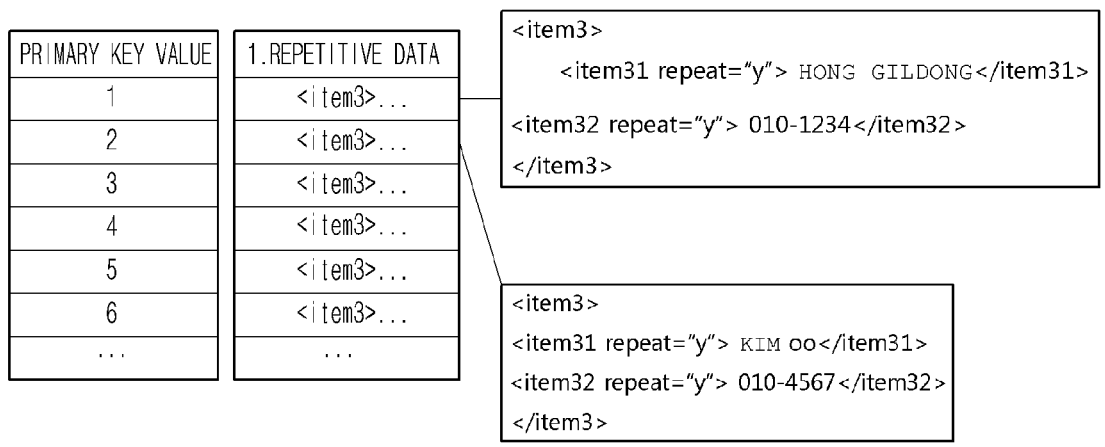
FIG. 14 is a diagram showing a state in which repetitive data stored in the repetitive data storage sheet is mapped to user-defined tags stored in an XML document for repetitive data conversion according to the present invention.

FIG. 14 is a diagram showing a state in which repetitive data stored in the repetitive data storage sheet is mapped to user-defined tags stored in an XML document for repetitive data conversion according to the present invention.

Meanwhile, as shown in FIG. 14, at the data mapping step S50, pieces of repetitive data stored in the repetitive data storage sheet and the user-defined tags stored in the XML document for repetitive data conversion may be mapped to one another.

Here, it is apparent that the mapping information of the repetitive data may be generated by respectively connecting pieces of resulting data, obtained as the result of executing the main query statement and the sub-query statement, to the user-defined tags of the XML document for repetitive data conversion.

The new XML document creation step S60 is the step of replacing the structural data of the source XML document with the resulting data stored in the storage sheet and then creating a new XML document.

In detail, the new XML document creation step S60 is the step of creating a new XML document having the same structure as the source XML document using the resulting data obtained as the result of executing the SQL query statement and the mapping information. At this step S60, pieces of data stored in the storage sheet are sequentially read, and thereafter a new XML document may be created using a data replacement procedure.

That is, parts "H_root/item1", "H_root/item2/item21", "H_root/item2/item22", and "bx_item3" contained in the following source XML document are replaced with the resulting data loaded from the SQL query statement, thus enabling a new XML document to be created.

```
<root>
    <item1>H_root/item1</item1>
    <item2>
            <item21>H_root/item2/item21</item21>
            <item22>H_root/item2/item22</item22>
    </item2>
    <item3>
            bx_item3
        </item3>
</root>
```

FIG. 15 is a diagram showing a state in which a new XML document is created at the new XML document creation step according to the present invention.

Here, as shown in FIG. 15, the number of new XML documents generated may be identical to the number of results of the execution of the main query statement by replacing the normal data and the repetitive data that have been loaded by executing the SQL query statement.

Figure 16:
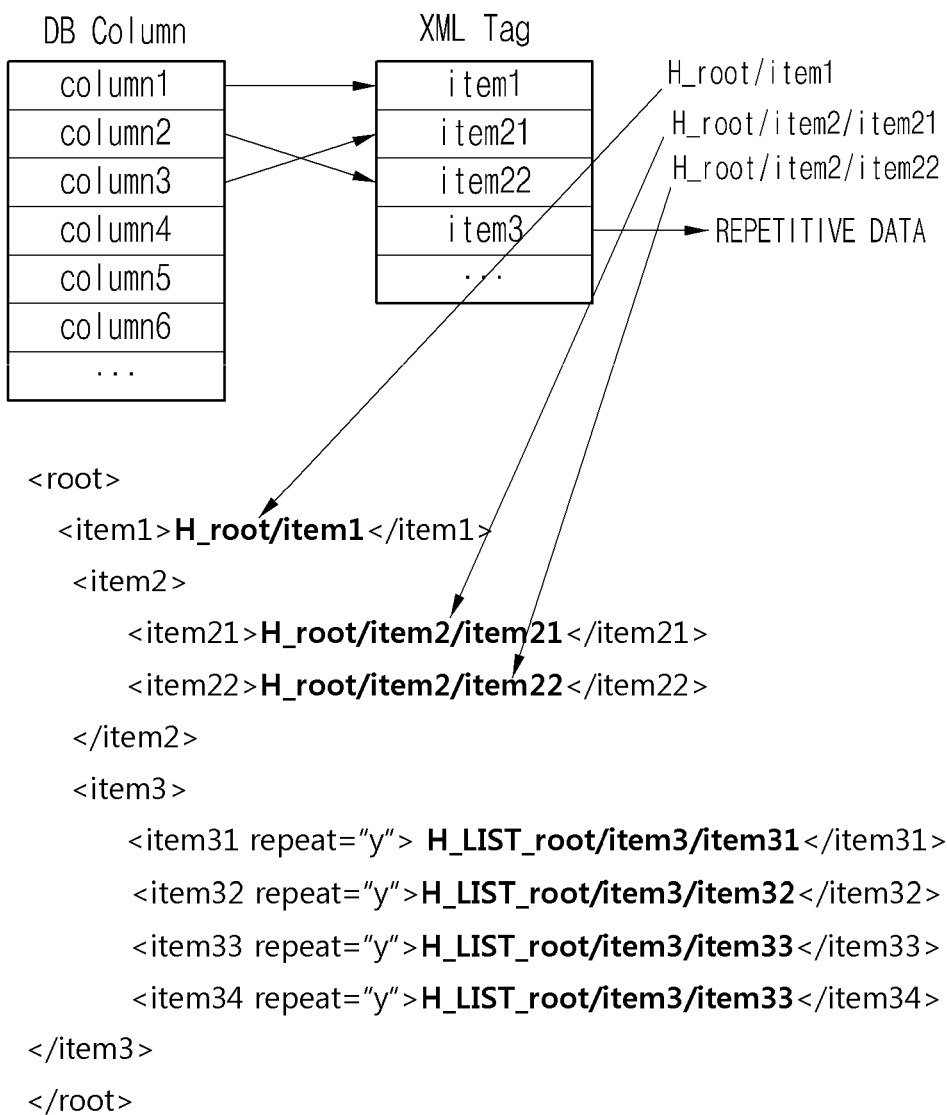
FIG. 16 is a detailed diagram showing the configuration of source code for creating a dynamic XML document from normal data according to the present invention.
Figure 17:
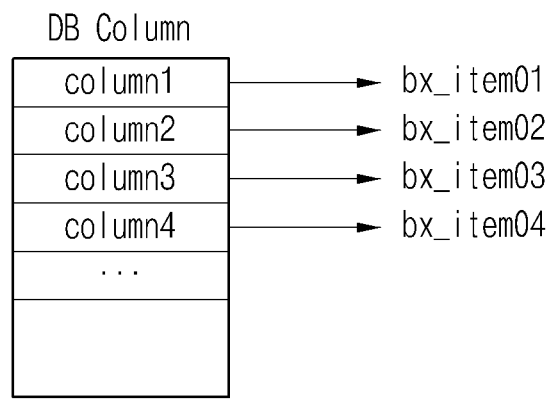
FIG. 17 is a detailed diagram showing the configuration of source code for creating a dynamic XML document from repetitive data according to the present invention.

FIG. 16 is a detailed diagram showing the configuration of source code for creating a dynamic XML document from normal data according to the present invention, and FIG. 17 is a detailed diagram showing the configuration of source code for creating a dynamic XML document from repetitive data according to the present invention.

In accordance with the method of converting the data of a DB and creating an XML document according to the present invention, the detailed diagram of source code for the normal data is depicted in FIG. 16, and the detailed diagram of source code for the repetitive data is depicted in FIG. 17.

Figure 2:
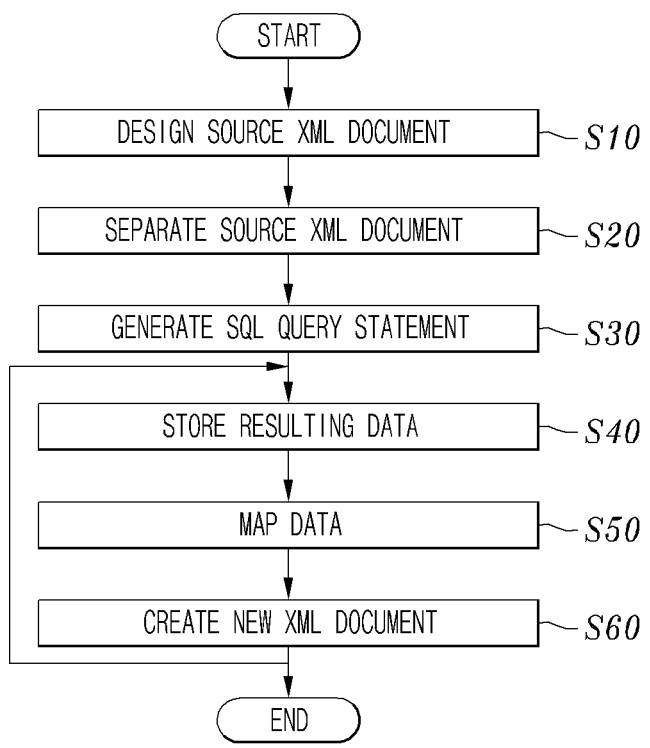
FIG. 2 is a second flowchart showing a method of converting the data of a DB and creating an XML document according to the present invention.
Figure 3:
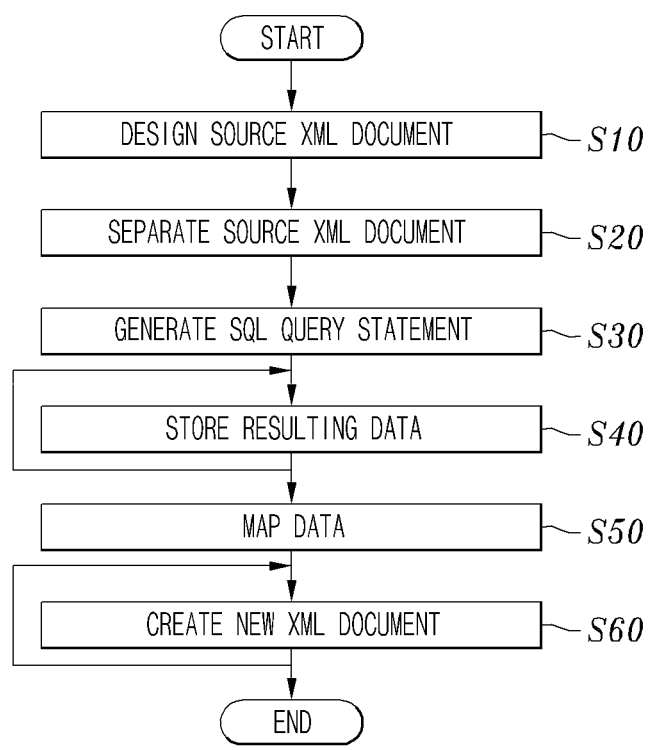
FIG. 3 is a third flowchart showing a method of converting the data of a DB and creating an XML document according to the present invention.

FIG. 2 is a second flowchart showing a method of converting the data of a DB and creating an XML document according to the present invention, and FIG. 3 is a third flowchart showing a method of converting the data of a DB and creating an XML document according to the present invention.

Meanwhile, the method of converting the data of a DB and creating an XML document according to the present invention may continuously create a plurality of new XML documents.

In detail, in order to continuously create a plurality of new XML documents according to the present invention, as shown in FIG. 2, after the new XML document creation step S60 has been performed, the resulting data storage step S40, the data mapping step S50, and the new XML document creation step S60 are continuously and repeatedly performed, thus continuously creating the plurality of new XML documents. Alternatively, as shown in FIG. 3, the resulting data storage step S40 is repeatedly performed and the resulting data is continuously stored in the storage sheets, and then the new XML document creation step S60 is repeatedly performed and the structural data of the source XML document is continuously replaced with the resulting data stored in the storage sheets, thus enabling a plurality of new XML documents to be continuously and repeatedly generated.

Hereinafter, a system for performing the method of converting the data of a DB and creating an XML document according to the present invention will be described.

Figure 18:
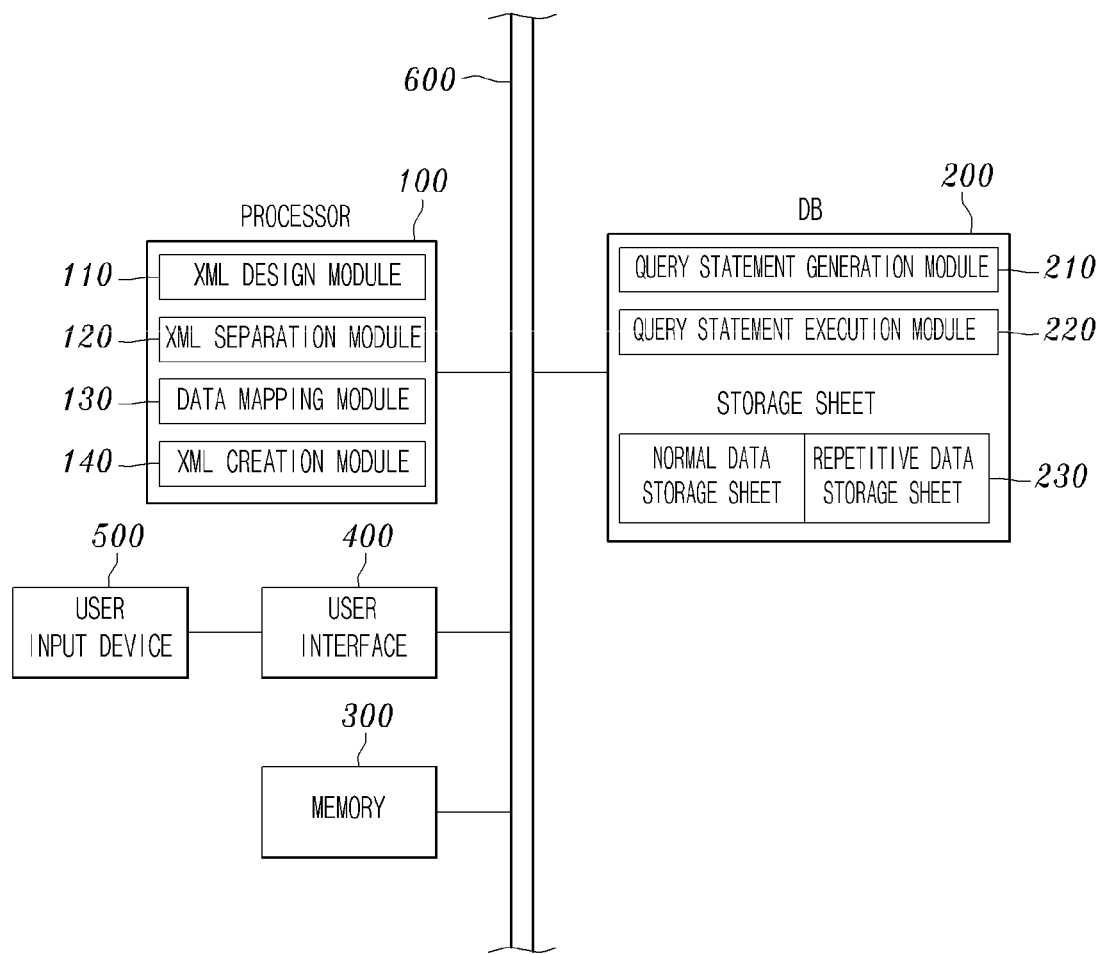
FIG. 18 is a block diagram showing a system suitable for using the present invention.

FIG. 18 is a block diagram showing a system suitable for using the present invention.

The system for performing the method of converting the data of a DB and creating an XML document according to the present invention may be implemented in a general-purpose microcomputer.

As shown in FIG. 18, the system may include a processor 100, a DB 200, memory 300, a user interface 400, and a user input device 500. These components may be connected to an information transfer communication means 600.

The processor 100 executes a program for performing the above-described method of the present invention. In this case, the program may be loaded into the memory, or may exist on a storage medium so that the program is loaded into the memory via a suitable storage medium interface.

In detail, the processor 100 includes an XML design module 110, an XML separation module 120, a data mapping module 130, and an XML creation module 140. The DB 200 may include a query statement generation module 210, a query statement execution module 220, and a storage sheet 230.

The XML design module 110 included in the processor 100 performs the source XML document design step S10 according to the method of the present invention, thus designing a source XML document provided with user-defined tags. The XML separation module 120 performs the source XML document separation step S20, thus separating the source XML document into an XML document for normal data conversion and an XML document for repetitive data conversion.

Further, the query statement generation module 210 included in the DB 200 performs the SQL query statement generation step S30 according to the method of the present invention, thus generating an SQL query statement for data to be converted in the DB 200. The query statement execution module 220 may perform the resulting data storage step S40, thus storing the resulting data obtained as the result of executing the SQL query statement in the storage sheet 230.

Furthermore, the data mapping module 130 included in the processor 100 performs the data mapping step S50 according to the method of the present invention, thus mapping the structural data of the source XML document and the resulting data stored in the storage sheet 230 to each other. The XML creation module 140 performs the new XML document creation step S60 to replace the structural data of the source XML document with the resulting data stored in the storage sheet 230, thus creating a new XML document.

As described above, the present invention can be easily applied to a scheme for converting large-capacity data stored in the DB and creating an XML document using a dynamic and gradual method so as to represent data having any tree structure without parsing an XML document having user-defined XML tags into an XML structure using a DOM. This can be applied to universal XML document construction systems, electronic commerce, Business to Business (B2B) document exchange, and XML searching, so that universal data structures can be efficiently represented, thus contributing to the convenience of development in various fields in which data stored in the DB is converted and then an XML document is created.

As described above, a method of converting the data of a DB and creating an XML document according to the present invention is advantageous in that a dynamic well-formed XML document which can be easily used can be promptly created from the large-capacity data of the DB by exploiting XML replacement technology without exploiting a Document Object Model (DOM).

Further, there is an advantage in that the XML document created according to the present invention is a well-formed document written in a W3C standard language, and can be immediately used on a web browser for the exchange of Business to Business (B2B, electronic commerce between businesses), can be used as an electronic commerce document, and can also be used for a search DB by collecting pieces of data stored in the DB and producing search tags.

Furthermore, there is an advantage in that when a W3C standard XML document created according to the present invention is stored in a server on the Internet, for example, in middleware, such a document can be immediately serviced to various types of devices (for example, a PC, a tablet PC, a smart phone, a smart TV, etc.) and can then be applied to implement cloud computing for N-Screen.

Although the method of converting the data of a DB and creating an XML document according to the present invention has been described with reference to the illustrated drawings, it is apparent that the present invention is not limited by the embodiments and the drawings disclosed in the present specification, and various modifications and changes may be made by those skilled in the art without departing from the scope and spirit of the invention.

What is claimed is:

1. A method of converting data of a database (DB) and creating an eXtensible Markup Language (XML) document, comprising:
    designing a source XML document provided with user-defined tags;
    separating the source XML document into an XML document for normal data conversion which is used when converting normal data, among structural data of the source XML document, and an XML document for repetitive data conversion which is used when converting repetitive data;

generating a Structured Query Language (SQL) query
statement for data to be converted in a DB;
executing the SQL query statement on the DB and thereafter storing resulting data obtained as a result of executing the SQL query statement in a storage sheet;
mapping the structural data of the source XML document to the resulting data stored in the storage sheet; and
creating a new XML document by replacing the structural data of the source XML document with the resulting data stored in the storage sheet;
wherein at the generating the SQL query statement, the SQL query statement comprises:
a main query statement for loading primary keys of large-capacity data included in the DB;
a main sub-query statement for connecting a plurality of pieces of table information using the primary keys and then loading the normal data; and
a sub-query statement for connecting a plurality of pieces of table information using the primary keys and then loading the repetitive data;
wherein at the storing the resulting data, the storage sheet comprises:
a normal data storage sheet for storing the normal data; and
a repetitive data storage sheet for storing the repetitive data;
wherein at the storing the resulting data, a method of storing the normal data of the resulting data comprises:
executing the main query statement and storing values of the primary keys and a number of results of execution of the main query statement in the normal data storage sheet; and
executing the main sub-query statement a number of times identical to the number of results of the execution of the main query statement and storing resulting data obtained from the execution in the normal data storage sheet; and
wherein at the storing the resulting data, a method of storing the repetitive data of the resulting data comprises:
executing the main query statement and storing values of the primary keys in the repetitive data storage sheet; and
executing the sub-query statement and storing resulting data obtained from the execution in the repetitive data storage sheet.

2. The method according to claim 1, wherein, after the creating the new XML document has been performed, the storing the resulting data, the mapping the structural data, and the creating the new XML document are continuously and repeatedly performed, thus continuously creating a plurality of new XML documents.

3. The method according to claim 1, wherein:
the storing the resulting data is repeatedly performed, and then resulting data is continuously stored in the storage sheet, and
the creating the new XML document is repeatedly performed, so that the structural data of the source XML document is continuously replaced with the resulting data stored in the storage sheet, thus continuously creating a plurality of new XML documents.

4. The method according to claim 1, wherein the designing the source XML document comprises:
defining a source XML document that includes a preset structure and preset source data by using the user-defined tags; and
duplicating the source XML document and then creating a duplicated XML document including a structure and source data which are identical to those of the source XML document.

5. The method according to claim 4, wherein at the defining the source XML document, the source XML document stores an absolute path of the user-defined tags as user-defined tag values using an XML tree structure.

6. The method according to claim 4, wherein at the defining the source XML document, when normal data and repetitive data which correspond to the structural data of the source XML document are indicated on user-defined tag values, they are separately indicated using different indication methods so that the normal data can be distinguished from the repetitive data.

7. The method according to claim 4, wherein at the defining the source XML document, when the user-defined tags of the source XML document are defined, if the structural data of the source XML document is repetitive data, the repetitive data is differently indicated by attributes.

8. The method according to claim 1, wherein at the separating the source XML document, the XML document for normal data conversion is stored after the repetitive data has been modified into a specific format indicating the repetitive data.

9. The method according to claim 1, wherein at the separating the source XML document, the XML document for repetitive data conversion is stored after replacement parts of the repetitive data have been modified into a specific format so that the replacement parts are sequentially replaced with the resulting data stored in the storage sheet.

10. The method according to claim 1, wherein at the mapping the structural data, the resulting data obtained as the result of executing the main query statement and the main sub-query statement is connected to user-defined tags of the XML document for normal data conversion, thus generating mapping information of the normal data.

11. The method according to claim 1, wherein at the mapping the structural data, the resulting data obtained as the result of executing the main query statement and the sub-query statement is connected to user-defined tags of the XML document for repetitive data conversion, thus generating mapping information of the repetitive data.

12. A system, the system comprising:
a processor; and
memory;
the memory storing instructions for causing the system to perform a method of converting data of a database (DB) and creating an eXtensible Markup Language (XML) document, comprising:
designing a source XML document provided with user-defined tags;
separating the source XML document into an XML document for normal data conversion which is used when converting normal data, among structural data of the source XML document, and an XML document for repetitive data conversion which is used when converting repetitive data;
generating a Structured Query Language (SQL) query statement for data to be converted in a DB;
executing the SQL query statement on the DB and thereafter storing resulting data obtained as a result of executing the SQL query statement in a storage sheet;
mapping the structural data of the source XML document to the resulting data stored in the storage sheet; and creating a new XML document by replacing the structural data of the source XML document with the resulting data stored in the storage sheet;

wherein at the generating the SQL query statement, the SQL query statement comprises:
  a main query statement for loading primary keys of large-capacity data included in the DB;
  a main sub-query statement for connecting a plurality of pieces of table information using the primary keys and then loading the normal data; and
  a sub-query statement for connecting a plurality of pieces of table information using the primary keys and then loading the repetitive data;

wherein at the storing the resulting data, the storage sheet comprises:
  a normal data storage sheet for storing the normal data; and
  a repetitive data storage sheet for storing the repetitive data;

wherein at the storing the resulting data, a method of storing the normal data of the resulting data comprises:
  executing the main query statement and storing values of the primary keys and a number of results of execution of the main query statement in the normal data storage sheet; and
  executing the main sub-query statement a number of times identical to the number of results of the execution of the main query statement and storing resulting data obtained from the execution in the normal data storage sheet; and wherein at the storing the resulting data, a method of storing the repetitive data of the resulting data comprises:
  executing the main query statement and storing values of the primary keys in the repetitive data storage sheet; and
  executing the sub-query statement and storing resulting data obtained from the execution in the repetitive data storage sheet.

13. The system according to claim 12, wherein, after the creating the new XML document has been performed, the storing the resulting data, the mapping the structural data, and the creating the new XML document are continuously and repeatedly performed, thus continuously creating a plurality of new XML documents.

14. The system according to claim 12, wherein:
the storing the resulting data is repeatedly performed, and then resulting data is continuously stored in the storage sheet, and
the creating the new XML document is repeatedly performed, so that the structural data of the source XML document is continuously replaced with the resulting data stored in the storage sheet, thus continuously creating a plurality of new XML documents.

15. The system according to claim 12, wherein the designing the source XML document comprises:
defining a source XML document that includes a preset structure and preset source data by using the user-defined tags; and
duplicating the source XML document and then creating a duplicated XML document including a structure and source data which are identical to those of the source XML document.

16. The system according to claim 15, wherein at the defining the source XML document, the source XML document stores an absolute path of the user-defined tags as user-defined tag values using an XML tree structure.

17. The system according to claim 15, wherein at the defining the source XML document, when normal data and repetitive data which correspond to the structural data of the source XML document are indicated on user-defined tag values, they are separately indicated using different indication methods so that the normal data can be distinguished from the repetitive data.

18. The system according to claim 15, wherein at the defining the source XML document, when the user-defined tags of the source XML document are defined, if the structural data of the source XML document is repetitive data, the repetitive data is differently indicated by attributes.

19. The system according to claim 12, wherein at the separating the source XML document, the XML document for normal data conversion is stored after the repetitive data has been modified into a specific format indicating the repetitive data.

20. A non-transitory computer-readable storage medium storing computer-executable instructions for causing a computing device to perform a method of converting data of a database (DB) and creating an eXtensible Markup Language (XML) document, comprising:
designing a source XML document provided with user-defined tags;
separating the source XML document into an XML document for normal data conversion which is used when converting normal data, among structural data of the source XML document, and an XML document for repetitive data conversion which is used when converting repetitive data;
generating a Structured Query Language (SQL) query statement for data to be converted in a DB;
executing the SQL query statement on the DB and thereafter storing resulting data obtained as a result of executing the SQL query statement in a storage sheet;
mapping the structural data of the source XML document to the resulting data stored in the storage sheet; and
creating a new XML document by replacing the structural data of the source XML document with the resulting data stored in the storage sheet;

wherein at the generating the SQL query statement, the SQL query statement comprises:
  a main query statement for loading primary keys of large-capacity data included in the DB;
  a main sub-query statement for connecting a plurality of pieces of table information using the primary keys and then loading the normal data; and
  a sub-query statement for connecting a plurality of pieces of table information using the primary keys and then loading the repetitive data;

wherein at the storing the resulting data, the storage sheet comprises:
  a normal data storage sheet for storing the normal data; and
  a repetitive data storage sheet for storing the repetitive data;

wherein at the storing the resulting data, a method of storing the normal data of the resulting data comprises:
  executing the main query statement and storing values of the primary keys and a number of results of execution of the main query statement in the normal data storage sheet; and
  executing the main sub-query statement a number of times identical to the number of results of the execution of the main query statement and storing resulting data obtained from the execution in the normal data storage sheet; and wherein at the storing the resulting data, a method of storing the repetitive data of the resulting data comprises:

executing the main query statement and storing values of the primary keys in the repetitive data storage sheet; and executing the sub-query statement and storing resulting data obtained from the execution in the repetitive data storage sheet.

\* \* \* \* \*